UNITED STATES PATENT OFFICE.

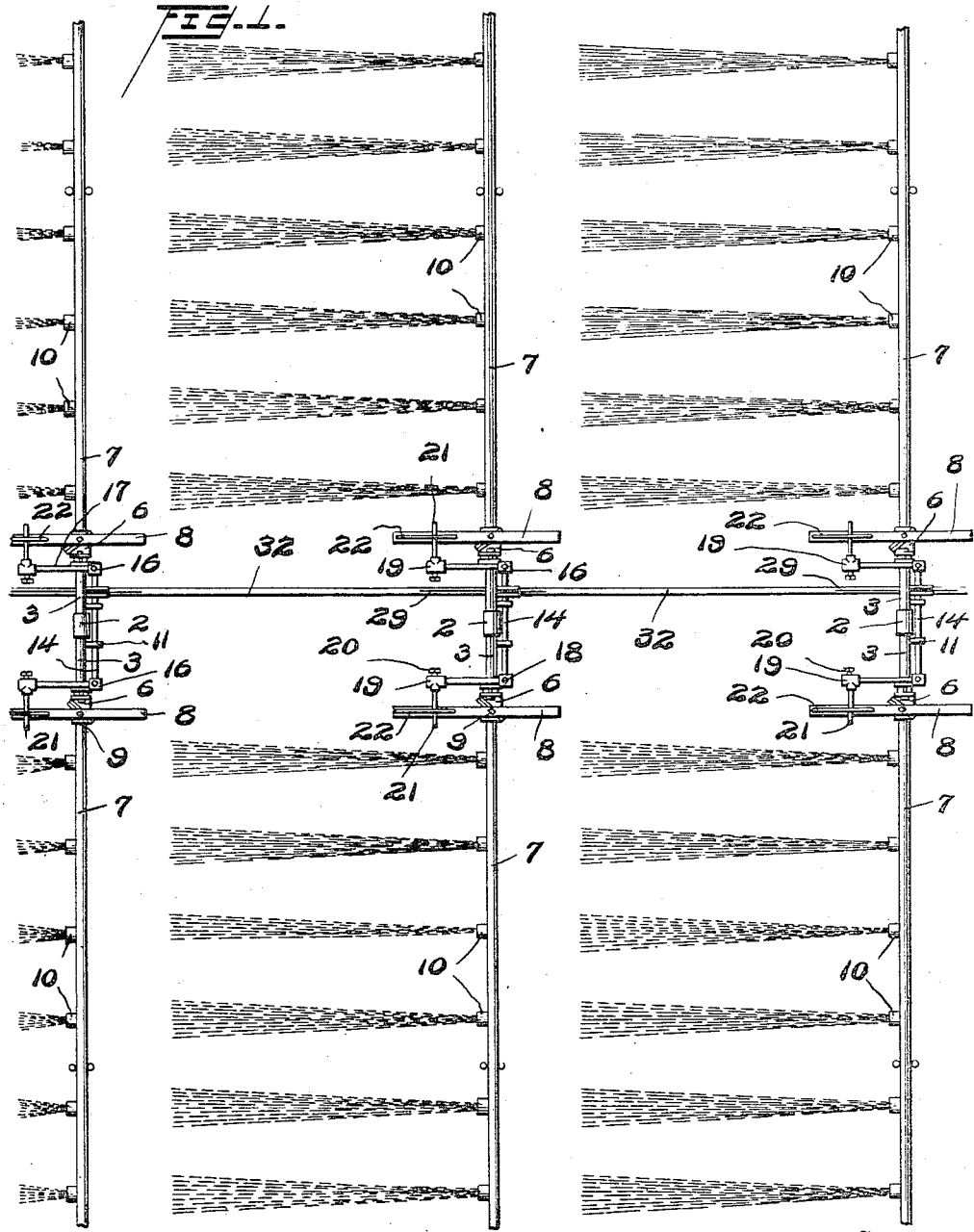

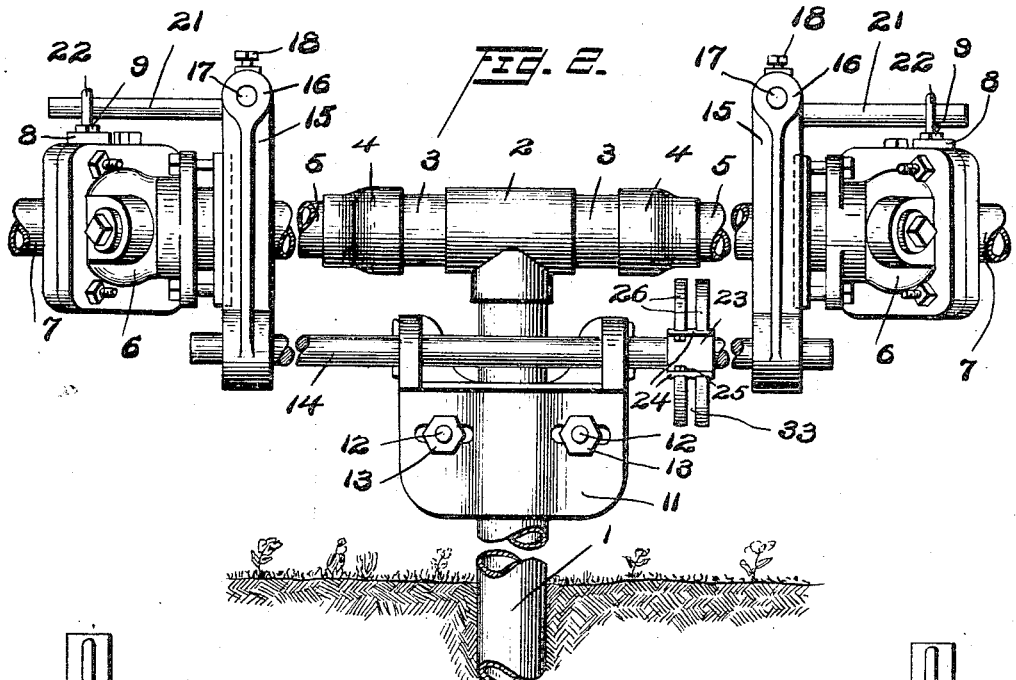
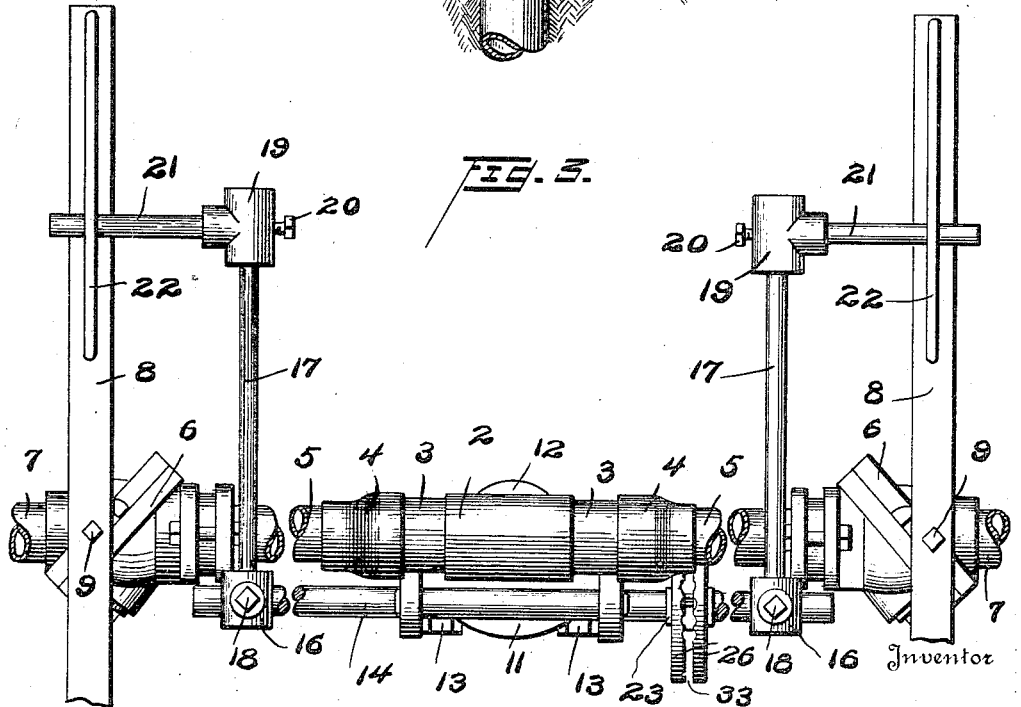

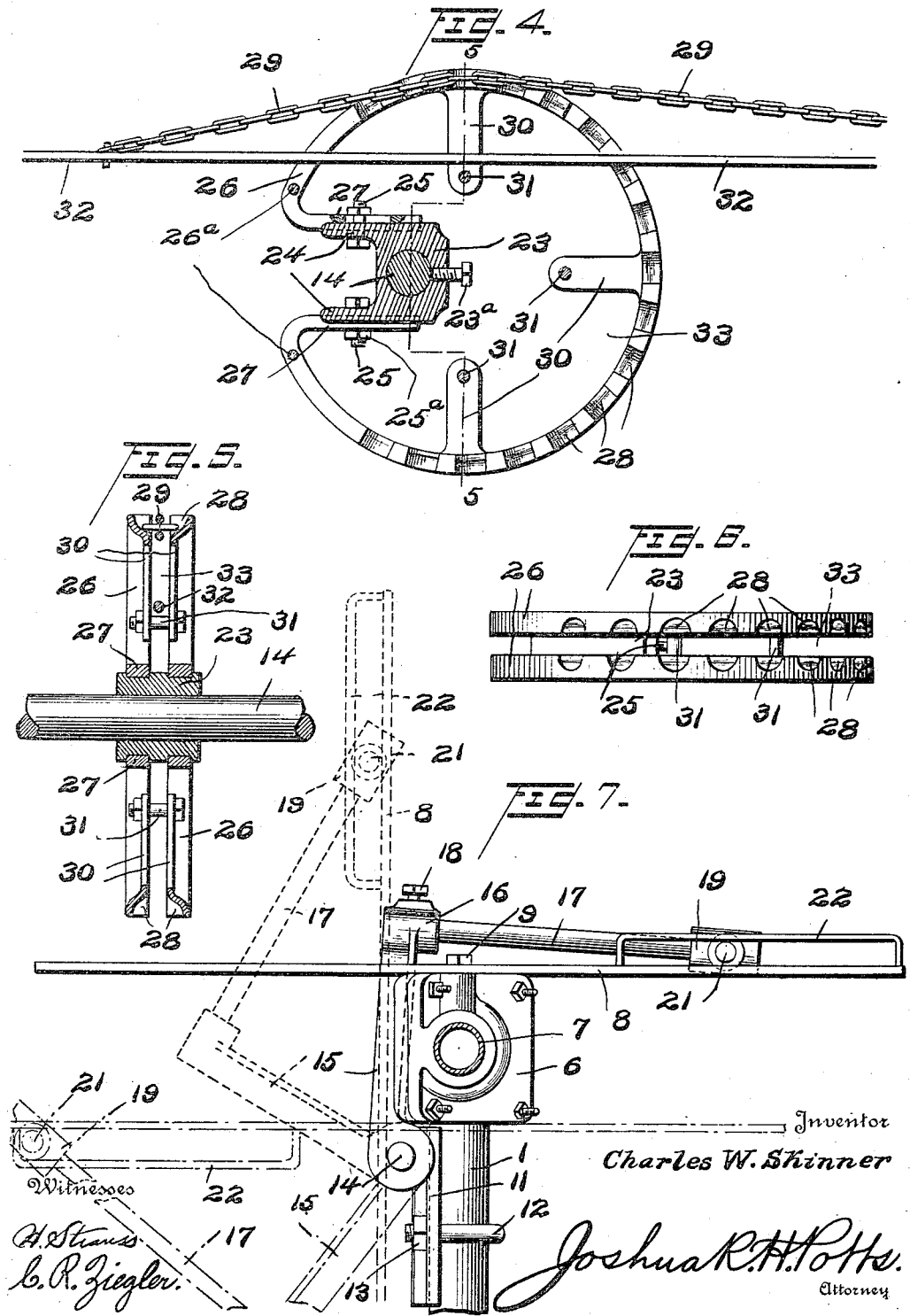

CHARLES W. SKINNER, OF NEWFIELD, NEW JERSEY.

IRRIGATING APPARATUS.

1,245,050.  Specification of Letters Patent.  Patented Oct. 30, 1917.

Application filed November 11, 1913. Serial No. 800,257.

*To all whom it may concern:*

Be it known that I, CHARLES W. SKINNER, a citizen of the United States, residing at Newfield, in the county of Gloucester and State of New Jersey, have invented certain new and useful Improvements in Irrigating Apparatus, of which the following is a specification.

My invention relates to improvements in irrigating apparatus, the object of the invention being to provide an improved arrangement of sprinkling pipes having rotary mounting with improved means for imparting an oscillating movement to the pipes, so that the nozzles which are provided throughout the length of the pipes will discharge streams of water over a wide territory at both sides of the pipe and at all intermediate points, whereby the ground and plants are uniformly moistened.

A further object is to provide an improved arrangement of crank arm and lever which permits the pipes to be manually oscillated whenever desired, and normally oscillated by means of the crank arms, and so arrange the crank shafts supporting the crank arms with relation to the pipes and the levers that the movement of the pipes in their oscillation varies in speed, moving slowest while the nozzles are in a general upright position, and moving fastest when the nozzles approach the horizontal, so that the water will be evenly distributed over the ground.

With these and other objects in view, the invention consists in certain novel features of construction and combinations and arrangements of parts as will be more fully hereinafter described and pointed out in the claims.

In the accompanying drawings:

Figure 1 is a diagrammatic plan view illustrating my improvements.

Fig. 2 is a broken view in side elevation illustrating a vertical supply pipe and two horizontal sprinkling pipes connected thereto and equipped with my improved operating mechanism.

Fig. 3 is a plan view of Fig. 2.

Fig. 4 is a view in section on an enlarged scale illustrating one of the segments 22.

Fig. 5 is a view in section on the line 5—5 of Fig. 4.

Fig. 6 is an edge view of the segment shown in Fig. 4, and

Fig. 7 is a view in end elevation of Fig. 3 showing the sprinkling pipe in section and illustrating the various positions of the crank arm and lever.

My improved irrigating apparatus comprises a plurality of vertical supply pipes 1 which project out of the ground the desired distance and are connected by T-couplings 2 with horizontal pipes 3, the latter are connected by reducing couplings 4 with smaller pipes 5, and said smaller pipes are connected by pipe unions 6 with horizontal sprinkling pipes 7.

These pipe unions 6 which form the subject matter of an application for patent filed November 11, 1913, Serial No. 800,258, permit the sprinkling pipes 7 to freely turn without any leakage and furthermore the unions operate to support levers 8 which are fulcrumed between their ends on bolts 9 screwed into the unions.

The sprinkling pipes 7 are of any desired length and are provided with alined nozzles 10 which direct the water in streams or sprays at right angles to the sprinkling pipes, and all of the pipes have their nozzles so arranged that they all discharge in the same direction.

The vertical supply pipes 1 each support a bracket 11 which is clamped thereto by bolts 12 and nuts 13. Each bracket 11 supports a crank shaft 14, and on the crank shaft 14 at its ends, arms 15 are secured. These arms 15, at their free ends, are provided with integral sleeves 16 in which rods 17 are secured at right angles thereto by means of set screws 18. On the free ends of the rods 17, T-couplings 19 are adjustably secured by set screws 20, and fingers 21 secured in the T-couplings, project at right angles to the respective rods 17 and extend through guides 22 fixed to levers 8.

The arms 15, rods 17, and fingers 21 constitute crank arms on the shaft 14 which when the shaft 14 is oscillated, compel the levers 8 to swing in the arc of a circle thereby oscillating the sprinkling pipes as will more fully hereinafter appear.

Each crank shaft 14 is provided with an improved segment 33 as shown most clearly in Figs. 4, 5, and 6. Each segment comprises two curved bands 26 which at their inner ends are bent inwardly in parallelism as shown at 27 and are secured by bolts 25 and nuts 25ª to lugs 24 on the end of a block 23, said block secured by set screw 23ª to the shaft 14. The ends 27 have longitudinal slots so that they may be adjusted on the bolts 25 to position the segment relative to the rod and it will be observed that the segment is in effect a cam or eccentric which imparts a varying movement to the sprinkling pipe to vary the speed of the rotary movement thereof as will more fully hereinafter appear.

The bands 26 are secured together by bolts or rivets 26ª and it is necessary to connect but one of the bands to the block 23 as the bands being secured together must turn together as a single part. These bands 26, throughout a portion of their length, are recessed as shown at 28, said recesses in the respective bands coöperating to form pockets to receive alternate links of a chain 29, so that the chain engages the segment to compel the same to turn when the chain is moved longitudinally.

The metal bands 26 forming the segment are provided with inwardly projecting radial fingers 30 which latter are connected by pins 31, to rigidly secure the bands together.

Both ends of all the chains 29 are connected to the wire 32, so that when the latter is moved longitudinally, it compels the chains 29 to impart a rotary movement to the segments 22 and to the sprinkling pipes 7 as above explained. It is, of course, to be understood that any number of sprinkling pipes with coöperating mechanism may be provided, and all may be operated simultaneously by the movement of the wire or cable 32.

With my improved irrigating apparatus, the sprinkling pipes turn through an arc of practically one hundred and eighty degrees (180°), and it is desirable that the sprinkling pipes should turn more slowly while the nozzles are moving past the vertical, because if the pipes turn at a uniform speed throughout their entire movement, the ground directly below the pipe will receive less water than the ground at the sides, because the nozzles while at varying angles from the horizontal, discharge the water on practically the same section of ground, hence while in this position, it is well to move the nozzles rapidly and to slow up the speed while the nozzles are passing the vertical position.

By reference particularly to Fig. 7, it will be noted how I accomplish this desired result. First, it will be observed that the crank shaft 14 is below the sprinkling pipe and that the finger 21 swings in a different arc than the lever 8, so that during the movement of the parts, the finger rides longitudinally in the guide 22. During the passage of the lever, as it nears the vertical, an appreciable part of the movement of the crank arm is taken up by the movement of the finger 21 longitudinally in the guide 23, while at other points, the greater portion of the movement is imparted to the lever and the speed correspondingly increased.

This variation in speed may be varied by adjusting the segments 33 or by raising and lowering the bracket 11 on the pipe 1, by adjusting the rod 17 in the sleeve 16 or by adjusting the T-coupling 19 on the rod 17. Any of these adjustments varies the arc through which the finger 21 swings and as the lever 8 always swings in the same arc, the difference in the movement of the finger and the lever controls the varying speed of the turning movement of the sprinkling pipe.

By reason of the construction above described, the sprinkling pipe can be manually operated whenever desired by swinging the lever 8 upon its pivot 9 to disconnect the same from the finger 21. Furthermore, it will be noted that the connection between finger 21 and the lever 8 is such that the finger will cause the movement of the sprinkling pipe if the latter is at an angle to the supply, and it frequently happens that it is necessary to so locate the pipes and the connection set forth permits of a wide range of variation in this respect.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. An apparatus of the character described, comprising a sprinkling pipe, means for imparting to said sprinkling pipe a partial rotary movement in opposite directions and causing the same to move at varying speeds during said movements in opposite directions, said means being adjustable to change the ratio of acceleration of the variable speeds in each direction, substantially as described.

2. An apparatus of the character described, comprising a sprinkling pipe, means for imparting to said sprinkling pipe a partial rotary movement in opposite directions and causing the same to move at varying speeds during both movements, said means comprising a crank arm adjustably connected to a member, said member being secured to the sprinkling pipe, and moving in a different arc from the movement of said member, substantially as described.

3. An apparatus of the character described, comprising a sprinkling pipe, means for imparting to said sprinkling pipe a partial rotary movement in opposite directions and causing the same to move at varying speeds during both movements, said means comprising a lever movably connected to the sprinkling pipe and extending at right angles thereto, a crank arm swinging in the arc of a circle different from the arc through which the lever moves, and a guide on said lever in which the free end of said crank arm moves longitudinally, substantially as described.

4. An apparatus of the character described, comprising a vertical supply pipe, a horizontal sprinkling pipe having rotary connection with the supply pipe, a bracket secured to the supply pipe, a crank shaft in the bracket, and located parallel to the sprinkling pipe, a crank arm on said crank shaft connected with and adapted to turn the sprinkling pipe, and means for oscillating said crank shaft, the connection between the crank and the sprinkling pipe comprising a means whereby said oscillation of the shaft imparts to said sprinkling pipe a partial rotary movement in opposite directions and causes the same to move at varying speeds during both movements, substantially as described.

5. An apparatus of the character described, comprising a vertical supply pipe, a horizontal sprinkling pipe having rotary connection with the supply pipe, a bracket secured to the supply pipe, a crank shaft in the bracket, a lever connected to the sprinkling pipe and extending at rigth angles thereto, a crank arm on the crank shaft having a laterally projecting finger, a guide extending longitudinally of the lever and into which the finger projects, and means for imparting an oscillating movement to the crank shaft, substantially as described.

6. An apparatus of the character described, comprising a vertical supply pipe, a horizontal sprinkling pipe having rotary connection with the supply pipe, a bracket secured to the supply pipe, a crank shaft in the bracket, a lever connected to the sprinkling pipe and extending at right angles thereto, a crank arm on the crank shaft having a laterally projecting finger, a guide extending longitudinally of the lever and into which the finger projects, said lever pivotally supported between its ends whereby the movement of the lever on its pivot will cause the guide to ride off the pin, and means for imparting an oscillating movement to the crank shaft, substantially as described.

7. An apparatus of the character described, comprising a vertical supply pipe, horizontally extending stationary pipes connected to the supply pipe, horizontal sprinkling pipes, unions connecting the sprinkling pipes with the stationary extensions of the supply pipe permitting rotary movement of the sprinkling pipes, levers pivotally connected between their ends to the unions, said levers having longitudinal guides, thereon, a bracket adjustably secured to the vertical supply pipe, a crank shaft supported in the bracket, means for oscillating the crank shaft, and crank arms secured to the crank shaft and having movable engagement in the guides of the levers, substantially as described.

8. An apparatus of the character described, comprising a vertical supply pipe, horizontally extending stationary pipes connected to the supply pipe, horizontal sprinkling pipes, unions connecting the sprinkling pipes with the stationary extensions of the supply pipe permitting rotary movement of the sprinkling pipes, levers pivotally connected between their ends to the unions, said levers having longitudinal guides thereon, a bracket adjustably secured to the vertical supply pipe, a crank shaft supported in the bracket, means for oscillating the crank shaft, arms fixed to the shaft, rods positioned at right angles to the arms and adjustably secured in the arms, and fingers located at right angles to the rods and adjustably secured to the rods, said fingers projecting into the guides on the levers, substantially as described.

9. An apparatus of the character described, comprising a plurality of vertical supply pipes, horizontal sprinkling pipes having rotary connection with the supply pipes, crank shafts supported on the supply pipes, devices on the sprinkling pipes, means connecting the said devices and the crank shafts, and causing the pipes to turn at varying speeds during the movement of said pipes, segments on the crank shafts, chains engaging in the segments, and a flexible device to which all of said chains are connected, whereby the movement of the flexible devices compels the simultaneous movement of all of the segments, substantially as described.

10. An apparatus of the character described, comprising a supply pipe, a sprinkling pipe, a union connecting the sprinkling pipe with the supply pipe permitting rotary movement of the sprinkling pipe, a lever pivotally connected to the union, and mechanical operating means removably connected to the lever adapted to be disconnected therefrom by the pivotal movement of the lever, said lever when disconnected from the mechanical means adapted to be manually operated to turn the sprinkling pipe, substantially as described.

11. An apparatus of the character described, comprising a supply pipe, a sprinkling pipe, a union connecting the said pipes permitting rotary movement of the sprinkling pipe, a lever pivotally connected to the union and permitting manual turning of the sprinkling pipe, a crank arm, and a finger on the crank arm having movable connection with the lever, whereby the operation of the crank arm compels the turning of the pipe through the medium of the finger, said connection between the finger and the lever permitting varying movements of the parts relative to each other, said lever adapted when swung on its pivots to be disconnected from the finger and permit the sprinkling pipe to be turned by means of the lever, substantially as described.

12. An apparatus of the character described, comprising a rotary sprinkling pipe, a support, a shaft mounted on the support, means on the shaft having connection with the sprinkling pipe for imparting an oscillating movement to said pipe, a segment adjustable in a transverse direction relative to the shaft and constituting an eccentric, and means on the periphery of the eccentric for imparting an oscillating movement thereto, substantially as described.

13. An apparatus of the character described, comprising a rotary sprinkling pipe, a support, a shaft mounted on the support, means on the shaft having connection with the sprinkling pipe for imparting an oscillating movement to said pipe, a block on the shaft, a segment comprising circular bands having inturned ends positioned at opposite sides of the block, means for adjustably securing said inturned ends to the block, and means on the periphery of the segment for transmitting motion thereto, substantially as described.

14. An apparatus of the character described, comprising a supply pipe, a sprinkling pipe, a union connecting the sprinkling pipe with the supply pipe permitting rotary movement of the sprinkling pipe, a lever connected to the union and having a guide therein, mechanical operating means movable within the guideway in the lever, said lever being movable to release its guiding means from the mechanical means, said lever when thus released being adapted to be manually operated to turn the sprinkling pipe, substantially as described.

15. An apparatus of the character described, comprising a water supply pipe, a sprinkling pipe, a union connecting the sprinkling pipe with the supply pipe permitting rotary movement of the sprinkling pipe, a lever pivotally connected to the union, and mechanically operating means removably connected to the lever, said lever when disconnected from the mechanical means by a pivotal movement being adapted to be manually operated to turn the sprinkling pipe, substantially as described.

In testimony whereof I have signed my name to this specification in the presence of two subscribing witnesses.

CHARLES W. SKINNER.

Witnesses:
S. W. FOSTER,
C. R. ZIEGLER.

Copies of this patent may be obtained for five cents each, by addressing the "Commissioner of Patents, Washington, D. C."